United States Patent Office

2,952,692
Patented Sept. 13, 1960

2,952,692

9α-HYDROXY-11-OXYGENATED STEROIDS AND METHOD OF PRODUCTION

Robert P. Graber, Elizabeth, and Norman L. Wendler, Summit, N.J., assignors to Merck & Co., Inc., Rahway, N.J., a corporation of New Jersey No Drawing. Filed Apr. 2, 1954, Ser. No. 420,734

14 Claims. (Cl. 260—397.45)

This invention relates to steroid compounds having the basic pregnane carbon skeleton characterized by the presence of a 9α-hydroxyl group. More particularly, it relates to pregnane compounds having oxygen substituents at the 9 and 11 positions. It is also concerned with methods of producing such compounds.

The novel 9α-hydroxy-11-oxygenated pregnanes and pregnenes of this invention are distinguished by the functional substituents present in rings B and C and may be conveniently represented structurally as follows:

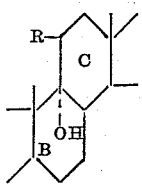

wherein R is a keto or hydroxy group. Apart from having this essential system in rings B and C, however, the novel 9α-hydroxy-11-oxygenated pregnanes and pregnenes included within the scope of this invention may vary considerably in structure. Thus, the 9α-hydroxy-11-oxygenated pregnanes and pregnenes may be substituted in one or more positions as follows, if desired: in the 3 position with a keto, hydroxy or acyloxy group; in the 17 position with an α or β hydroxy group; in the 20 position with a keto group and in the 21 position with a hydroxy or acylated hydroxy group. In addition to such fully saturated pregnanes, similar pregnene compounds are also provided, as for example, pregnenes having double bonds at one or more positions such as Δ¹, Δ⁴, Δ⁵, Δ⁶, Δ⁷ and Δ¹⁴. If necessary, any such double bond may be intermediarily protected in known manner, for instance, by saturation with halogen or hydrogen halide or by conversion into pentacyclic isosteroids. Both the pregnanes and pregnenes as described above are made available in the normal and allo series when structurally possible according to the position of unsaturation.

Compounds having the structural criteria described above exert cortisone-like activity and adrenal hormone activity. They are also useful as intermediates in the preparation of other valuable steroid compounds.

The 9α-hydroxy-11-oxygenated pregnanes and pregnenes of this invention are conveniently produced according to unique processes starting with 9β,11β-oxido derivatives of normal and allo pregnanes and pregnenes. By hydrolytically cleaving the 9β,11β-oxide there is obtained the corresponding 9α,11β-dihydroxy pregnane or pregnene. The 9α,11β-dihydroxy compound is then oxidized to the corresponding 9α-hydroxy-11-keto pregnane or pregnene.

Examples of 9β,11β-oxides which may be used as starting materials are 9β,11β-oxido-Δ⁴-pregnene-17α,21-diol-3,20-dione, 9β,11β-oxido-Δ⁴-pregnene-21-ol-3,20-dione and 21-acylates of such compounds, such as the acetate, propionate, butyrate, benzoate and phenylacetate, 9β,11β-oxido-Δ⁴-pregnene-17α-ol-3,30-dione, 9β,11β-oxido-Δ⁴-pregnene-3,20-dione, 9β,11β-oxido-Δ⁴-pregnene-3-one, similar compounds having a 3α-hydroxyl or 3β-hydroxyl group or acylates thereof such as previously specified, and the corresponding compounds in the pregnane and allopregnane series. In addition, pregnenes similar to those specified but having double bonds such as in the Δ¹, Δ⁶ and Δ⁷-positions rather than at Δ⁴ may also be used. These and related compounds are conveniently prepared by methods known in the art such as is described in the J. Am. Chem. Soc., 75, 2273 (1953).

In the first step of this invention the 9β,11β-oxido pregnane or pregnene is converted to the corresponding 9α,11β-dihydroxy compound by treatment with a strong nonoxidizing mineral acid. Acids such as hydrochloric acid, sulfuric acid, phosphoric acid and perchloric acid are particularly suitable for effecting this reaction. The reaction may be conveniently achieved by treating the 9β,11β-oxido pregnane or pregnene with the mineral acid in aqueous solvent mixture. It is preferred that the organic solvent employed be nonreactive with the steroid compound. Solvents such as dioxane, tetrahydrofuran, acetone, benzene, diethyl ether and the like are satisfactory. The presence of water is required in order to insure formation of the desired glycol. At room temperature the reaction proceeds slowly, often requiring from 24 to 72 hours. By the use of slightly elevated temperatures the reaction time may be reduced considerably. After the reaction has gone to completion the desired 9α,11β-dihydroxy pregnane or pregnene can be conveniently recovered from the reaction mixture by known methods. Thus, the reaction mixture may be extracted with a suitable solvent and the solvent extract washed with water to remove acid. The organic layer is evaporated to dryness under reduced pressure to obtain the product.

One reaction illustrative of this method is the treatment of 9β,11β-oxido-Δ⁴-pregnene-17α,21-diol-3,20-dione with perchloric acid to produce Δ⁴-pregnene-9α,11β,17α,21-tetrol-3,20-dione. This reaction may also be applied to the corresponding 21-acylates of the starting material, such as 9β,11β-oxido-Δ⁴-pregnene-17α,21-diol-3,20-dione-21-acetate, but in the course of the reaction the 21-acyl group may be hydrolyzed and the desired 9α,11β-dihydroxy pregnane obtained as the 21-alcohol. Examples of other novel compounds that are produced in the described manner starting with either the 21-hydroxy pregnanes, or pregnenes, or 21-acylates thereof, are Δ⁴-pregnene-9α,11β,21-triol-3,20-dione, Δ⁴-pregnene-9α,11β,17α-triol-3,20-dione, Δ⁴-pregnene-9α,11β-diol-3,20-dione, Δ⁴-pregnene-9α,11β-diol-3-one, pregnane-9α,11β,21-triol-3,20-dione, pregnane-3α,9α,11β,17α,21-pentol-20-one, pregnane-9α,11β,17α-triol-3,20-dione, pregnane-9α,11β-diol-3,20-dione, pregnane-3α,9α,11β-triol-20-one pregnane-9α,11β-diol-3-one, pregnane-3α,9α,11β,21-tetrol-20-one, pregnane-3β,9α,11β,21-tetrol-20-one, pregnane-3α,9α,11β,17α-tetrol-20-one, pregnane-3β,9α,11β,17α,tetrol-20-one, allopregnane-9α,11β,17α,21-tetrol-3,20-dione, allopregnane-9α,11β,21-triol-3,20-dione, allopregnane-9α,11β,17α,21-tetrol-20-one, allopregnane-9α,11β,21-triol-20-one, allopregnane-9α,11β,17α-triol-3,20-dione, allopregnane-9α,11β-diol-3,20-dione, allopregnane-3α,9α,11β,21-tetrol-20-one and the like.

These and similar compounds having hydroxy groups in the 3 and/or 21 positions may be reacted with an acylating agent to obtain the corresponding acylated compounds. This reaction is conveniently effected by treating the 3 and/or 21 hydroxy compounds with acylating agents such as carboxylic acid anhydride, halide, ester or ketone under solvent conditions. An excess of liquid acylating agent such as the lower carboxylic acid anhydrides, or a suitable inert organic solvent such as pyridine and alkyl derivatives thereof, tertiary bases such as dialkyl anilines, quinolines and trialkyl amines may be utilized as the solvent medium. The reaction proceeds at room temperature and is complete in from about 1 to 12 hours. After the reaction is complete the mixture may be diluted with water to decompose the excess acylating agent. The product may be recovered by extraction of the aqueous mixture with an immiscible solvent such as ethyl acetate followed by evaporation of the organic extract to dryness. In this manner, mono and/or diacylates such as the acetate, propionate, butyrate, benzoate and phenylacetate of the 9α,11β-dihydroxy compounds such as those listed above may be produced.

The 9α,11β-dihydroxy compounds are conveniently converted to the corresponding 9α-hydroxy-11-keto compounds by the action of an oxidizing agent. Any suitable oxidizing agent may be employed but is usually preferred to employ chromium trioxide in glacial acetic acid or an N-halo amide or imide such as N-bromoacetamide in an inert solvent. The reaction goes to completion in a reasonably short time at room temperature, e.g., 10 minutes usually being adequate when chromium trioxide is employed and somewhat longer times being preferred with other oxidizing agents. The desired product may be readily recovered from the reaction mixture by standard isolation techniques.

In general, any of the 9α,11β-dihydroxy pregnanes, allopregnanes and pregnenes such as those disclosed hereinabove may be oxidized to the corresponding 9α-hydroxy-11-keto compounds. When other oxidizable substituents are present in other parts of the molecule, they are preferably deactivated or protected against oxidation, such as by esterification. Such protective groups, e.g., esters, are not hydrolyzed during the oxidation but, on the contrary, the desired 9α-hydroxy-11-keto compounds are obtained as the corresponding esters. Although any suitable esters may be prepared and used, it is generally preferred to employ esters in which the acyl group is aliphatic and contains 1 to 8 carbon atoms.

A specific illustration of this oxidation reaction is the treatment of Δ⁴-pregnene-9α,11β,17α,21-tetrol-3,20-dione-21-acetate with chromium trioxide in glacial acetic acid containing a trace of water to produce Δ⁴-pregnene-9α,17α,21-triol-3,11,20-trione-21-acetate. Similarly, starting with other 21-esters of Δ⁴-pregnene-9α,11β,17α-21-tetrol-3,20-dione such as the propionate, butyrate, benzoate and the like, there is obtained the corresponding 21-ester of Δ⁴-pregnene-9α,17α,21-triol-3,11,20-trione. Other compounds which may be readily produced by oxidation of the corresponding 9α,11β-dihydroxy compounds are Δ⁴-pregnene-9α,21-diol-3,11,20-trione-21-acetate, Δ⁴-pregnene-9α,17α-diol-3,11,20-trione, Δ⁴-pregnene-9α-ol-3,11,20-trione, Δ⁴-pregnene-9α-ol-3,11-dione, pregnane-9α,21-diol-3,11,20-trione-21-acetate, pregnane-9α,17α-diol-3,11,20-trione-pregnane-9α-ol-3,11,20-trione, pregnane-9α-ol-3,11-dione, pregnane-3α,9α,21-triol-11,20-dione-3,21-diacetate, pregnane-3β,9α,21-triol-11,20-dione-3,21-diacetate, pregnane-3α,9α,17α-triol-11,20-dione-3-propionate, pregnane-3β,9α,17α-triol-11,20-dione-3-hemisuccinate, allopregnane-9α,17α,21-triol-3,11,20-trione-21-acetate, allopregnane-9α,21-diol-3,11,20-trione-21-acetate, allopregnane-9α,17α-diol-3,11,20-trione, allopregnane-9α-ol-3,11,20-trione, allopregnane-3α,9α,21-triol-11,20-dione-3,21-diacetate, and other corresponding acylates such as the propionate, butyrate, benzoate, phenylacetate and the like.

The following examples are added to illustrate but not to limit the invention.

EXAMPLE 1

Δ⁴-pregnene-9α,11β,17α,21-tetrol-3,20-dione (9α-hydroxyhydrocortisone) and the 21-acetate thereof A solution of 4.345 g. of 9β,11β-oxido-Δ⁴-pregnene-17α,21-diol-3,20-dione-21-acetate in 72 ml. of purified dioxane and 36 ml. of 2.0 M aqueous perchloric acid was allowed to stand at room temperature for 65 hours. The solution became deep yellow in color. About 185 ml. of saturated aqueous sodium chloride was added and two layers separated. To the mixture was added 100 ml. of ethyl acetate followed by shaking. The layers were separated and the aqueous layer was extracted three times with 50 ml. portions of ethyl acetate. The combined organic extracts were washed with water, saturated salt solution and filtered. By evaporating the organic filtrate to dryness there was obtained a yellow crystalline residue of Δ⁴-pregnene-9α,11β,17α,21-tetrol-3,20-dione. The product was recrystallized from acetone-chloroform and then from acetone: M.P. 243–249° C. (dec.); λ max. in CH₃OH=2420 A.

$(E^{1\%}_{1cm.}=411)$

A suspension of 151.5 mg. of Δ⁴-pregnene-9α,11β,17α,21-tetrol-3,20-dione in 2.0 ml. of acetic anhydride and 0.32 ml. of pyridine was allowed to stand at room temperature overnight. The solvents were removed and the residue triturated with 3.0 ml. of water. The colorless solid was filtered and washed with water and ether. On recrystallization from acetone-ether the Δ⁴-pregnene-9α,11β,17α,21-tetrol-3,20-dione-21-acetate melted at 214–216.5° C.; λ max. in CH₃OH=2420 A.

$(E^{1\%}_{1cm.}=369)$

EXAMPLE 2

Δ⁴-pregnene-9α,11β,21-triol-3,20-dione (9α-hydroxycorticosterone) and the 21-acetate thereof About 0.550 g. of 9β,11β-oxido-Δ⁴-pregnene-21-ol-3,20-dione-21-acetate was added to 10.7 ml. of dioxane. Then 5.4 ml. of 2.0 M aqueous perchloric acid was added to the solution and the mixture was allowed to stand for 67 hours at room temperature. The resulting deep yellow solution was treated as in Example 1 to isolate Δ⁴-pregnene-9α,11β,21-triol-3,20-dione; M.P. 217–222.5° C. with previous softening.

A 250 mg. sample of Δ⁴-pregnene-9α,11β,21-triol-3,20-dione was added to 3.5 ml. of acetic anhydride and 0.55 ml. of pyridine. The solution was allowed to stand overnight at room temperature. About 20 ml. of water was added cautiously to the reaction mixture which was then extracted with ethyl acetate. The organic extracts were washed with dilute hydrochloric acid, water, 5% aqueous sodium bicarbonate and water. The organic extract was evaporated to dryness to obtain Δ⁴-pregnene-9α,11β,21-triol-3,20-dione-21-acetate; M.P. 171–175° C. after recrystallization from acetone-ether.

The 9β,11β-oxido-Δ⁴-pregnene-21-ol-3,20-dione-21-acetate was prepared as follows:

A solution of 0.740 g. of 9α-bromo-Δ⁴-pregnene-11,21-diol-3,20-dione-21-acetate and 0.940 g. of potassium acetate in 34 ml. of absolute ethyl alcohol was heated under reflux for one and one-half hours under nitrogen. The mixture was then evaporated to dryness. The crystalline residue was treated with 50 ml. of water and the organic material extracted with ethyl acetate. The ethyl acetate extracts were combined and washed. By evaporating the solvent and recrystallization of the residue from acetone-ether 9β,11β-oxido-Δ⁴-pregnene-21-ol-3,20-dione-21-acetate was obtained, M.P. 137–140° C.

EXAMPLE 3

Δ⁴-pregnene-9α,17α,21-triol-3,11,20-trione (9α-hydroxycortisone) and the 21-acetate thereof To a solution of 61.3 mg. of chromium trioxide in two drops of water and 4.9 ml. of glacial acetic acid was added 386.2 mg. of Δ⁴-pregnene-9α,11β,17α,21-tetrol-3,20-dione-21-acetate. The solid dissolved readily on swirling, and, after 12 minutes, 25 ml. of water was added. The crystalline precipitate which formed was extracted with three portions of ethyl acetate. The combined ethyl acetate extracts were washed four times with water, five times with 5% aqueous sodium bicarbonate, and twice with saturated salt solution. After drying, the ethyl acetate was removed in vacuo to give a colorless crystalline residue, weight 358 mg. M.P. 228.5–235° C. with previous softening. Two recrystallizations from acetone-ether afforded $\Delta^4$-pregnene-9$\alpha$,17$\alpha$,21-triol-3,11,20-trione-21-acetate as rosettes of needles: M.P. 237–243.5° C.; $\lambda$ max. in $CH_3OH=2380$ A.

$$(E_{1\,cm.}^{1\%}=373)$$

*Analysis.*—Calcd. for $C_{23}H_{30}O_7$: C. 66.01; H, 7.23. Found (dried at 100°): C, 66.14; H, 7.02.

A suspension of 418.5 mg. of $\Delta^4$-pregnene-9$\alpha$,17$\alpha$,21-triol-3,11,20-trione-21-acetate in 11 ml. of methanol is heated to reflux in a nitrogen atmosphere. Then 2 ml. of 1.0 M aqueous potassium bicarbonate was added to the refluxing solution. After 15 minutes the reaction mixture is cooled to room temperature and the excess potassium bicarbonate was neutralized with dilute acetic acid. The solvents were removed by evaporation, the residue was taken up in 10 ml. of water and the aqueous mixture was extracted with ethyl acetate. The $\Delta^4$-pregnene-9$\alpha$,17$\alpha$,21-triol-3,11,20-trione was isolated by evaporation of the ethyl acetate.

EXAMPLE 4

$\Delta^4$-*pregnene-9$\alpha$,21-diol-3,11,20-trione* (*9$\alpha$-hydroxy-11-dehydrocorticosterone*) *and the 21-acetate thereof*

To a solution of 32.7 mg. of chromium trioxide in one drop of water and 1.5 ml. of glacial acetic acid was added 194 mg. of $\Delta^4$-pregnene-9$\alpha$,11$\beta$,21-triol-3,20-dione-21-acetate. The solid dissolved readily on stirring. After standing 10 minutes at room temperature the mixture was diluted with 8.5 ml. of water. The fine needles of $\Delta^4$-pregnene-9$\alpha$,21-diol-3,11,20-trione-21-acetate which separated were filtered, washed with water and dried; M.P. 230.5–236° C. after recrystallization from acetone-ether; $\lambda$ max. in $CH_3OH=2380$ A.

$$(E_{1\,cm.}^{1\%}=384)$$

Saponification of the 21-acetate to give $\Delta^4$-pregnene-9$\alpha$,17$\alpha$,21-triol-3,11,20-trione was effected as in Example 3.

Various changes and modifications of the invention can be made and, to the extent that such variations incorporate the spirit of this invention, they are intended to be included within the scope of the appended claims.

What is claimed is:

1. A compound selected from the group consisting of $\Delta^4$-pregnene-9$\alpha$,11$\beta$,17$\alpha$,21-tetrol-3,20-dione, $\Delta^4$-pregnene-9$\alpha$,17$\alpha$,21-triol-3,11,20-trione, $\Delta^4$-pregnene-9$\alpha$,11$\beta$,21-triol-3,20-dione, $\Delta^4$-pregnene-9$\alpha$,21-diol-3,11,20-trione and 21-acyloxy derivatives thereof wherein the acyl radical is derived from an organic carboxylic acid having less than nine carbon atoms.

2. $\Delta^4$-pregnene-9$\alpha$,11$\beta$,17$\alpha$,21-tetrol-3,20-dione.
3. $\Delta^4$-pregnene-9$\alpha$,11$\beta$,21-triol-3,20-dione.
4. $\Delta^4$-pregnene-9$\alpha$,17$\alpha$,21-triol-3,11,20-trione.
5. The process which comprises reacting a 9$\beta$,11$\beta$-oxido-20-keto-steroid having the pregnane carbon skeleton with an aqueous strong mineral acid to produce a 9$\alpha$,11$\beta$-dihydroxy-20-keto steroid having the pregnane structure, deactivating oxidizable groups except the 9$\alpha$,11$\beta$-dihydroxy groups and reacting said compound with an oxidizing agent to produce the corresponding 9$\alpha$-hydroxy-11,20-diketo steroid.
6. The process which comprises reacting a 9$\beta$,11$\beta$-oxido-20-keto-steroid having the pregnane carbon skeleton with an aqueous strong mineral acid to produce a 9$\alpha$,11$\beta$-dihydroxy-20-keto steroid having the pregnane structure.
7. The process which comprises reacting a 9$\beta$,11$\beta$-oxido-$\Delta^4$-pregnene-21-ol-20-one with an aqueous strong mineral acid to produce a $\Delta^4$-pregnene-9$\alpha$,11$\beta$,21-triol-20-one.
8. The process which comprises reacting a 9$\beta$,11$\beta$-oxido-$\Delta^4$-pregnene-17$\alpha$,21-diol-3,20-dione with an aqueous strong mineral acid to produce a $\Delta^4$-pregnene-9$\alpha$,11$\beta$,17$\alpha$,21-tetrol-3,20-dione.
9. The process which comprises reacting a 9$\beta$,11$\beta$-oxido-$\Delta^4$-pregnene-21-ol-3,20-dione with an aqueous strong mineral acid to produce a $\Delta^4$-pregnene-9$\alpha$,11$\beta$,21-triol-3,20-dione.
10. The process which comprises reacting a 9$\alpha$,11$\beta$-dihydroxy-20-keto-steroid having the pregnane carbon skeleton with an oxidizing agent to produce the corresponding 9$\alpha$-hydroxy-11,20-diketo steroid.
11. The process which comprises reacting a $\Delta^4$-pregnene-9$\alpha$,11$\beta$,17$\alpha$,21-tetrol-3,20-dione 21-acylate wherein the acyl radical is derived from an organic carboxylic acid having less than nine carbon atoms with an oxidizing agent to produce the corresponding $\Delta^4$-pregnene-9$\alpha$,17$\alpha$,21-triol-3,11,20-trione-21-acylate.
12. The process which comprises reacting a $\Delta^4$-pregnene-9$\alpha$,11$\beta$,21-triol-3,20-dione 21-acylate wherein the acyl radical is derived from an organic carboxylic acid having less than nine carbon atoms with an oxidizing agent to produce the corresponding $\Delta^4$-pregnene-9$\alpha$,21-diol-3,11,20-trione-21-acylate.
13. $\Delta^4$-pregnene-9$\alpha$,11$\beta$,17$\alpha$,21-tetrol-3,20-dione-21-acetate.
14. $\Delta^4$-pregnene-9$\alpha$,17$\alpha$,21-triol-3,11,20-trione-21-acetate.

References Cited in the file of this patent

UNITED STATES PATENTS 2,794,033     Laubach _____ May 28, 1957

OTHER REFERENCES

Fieser et al.: Natural Products Related to Phenanthrene, 3rd edition, pages 424–426 (1949).